(12) United States Patent
Poland et al.

(10) Patent No.: US 6,669,641 B2
(45) Date of Patent: Dec. 30, 2003

(54) METHOD OF AND SYSTEM FOR ULTRASOUND IMAGING

(75) Inventors: McKee Dunn Poland, Andover, MA (US); Janice Frisa, Atkinson, NH (US); Bernard J. Savord, Andover, MA (US); Ivan Salgo, Andover, MA (US); Douglas Demers, Haverhill, MA (US); Mark Ward, Methuen, MA (US); Paul Detmer, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/269,170

(22) Filed: Oct. 10, 2002

(65) Prior Publication Data

US 2003/0097067 A1 May 22, 2003

Related U.S. Application Data

(63) Continuation-in-part of application No. 10/231,704, filed on Aug. 29, 2002, which is a continuation-in-part of application No. 09/641,306, filed on Aug. 17, 2000, now Pat. No. 6,443,896.

(51) Int. Cl.[7] .................................................. A61B 8/02
(52) U.S. Cl. ...................................................... 600/447
(58) Field of Search ................................. 600/447, 459, 600/443, 437, 444, 587; 73/606, 626; 128/916

(56) References Cited

U.S. PATENT DOCUMENTS

| 5,070,879 | A | * | 12/1991 | Herres .......................... 600/444 |
| 5,546,807 | A | * | 8/1996 | Oxaal et al. ................... 73/606 |
| 6,083,168 | A | * | 7/2000 | Hossack et al. ............. 600/443 |
| 6,099,474 | A | * | 8/2000 | Solek ........................... 600/459 |
| 6,241,675 | B1 | * | 6/2001 | Smith et al. ................. 600/443 |
| 6,245,017 | B1 | * | 6/2001 | Hashimoto et al. ......... 600/447 |
| 6,261,234 | B1 | * | 7/2001 | Lin .............................. 600/461 |

* cited by examiner

Primary Examiner—Dennis Ruhl
Assistant Examiner—Ruby Jain
(74) Attorney, Agent, or Firm—John Vodopia

(57) ABSTRACT

An ultrasonic apparatus and method are described in which a volumetric region of the body is imaged by biplane images. One biplane image has a fixed planar orientation to the transducer, and the plane of the other biplane image can be varied in relation to the fixed reference image. In a preferred embodiment one image can be rotated relative to the other, and can be tilted relative to the other. An image orientation icon is shown on the display screen together with the two biplane images depicting the relative orientation of the two planar images.

14 Claims, 7 Drawing Sheets

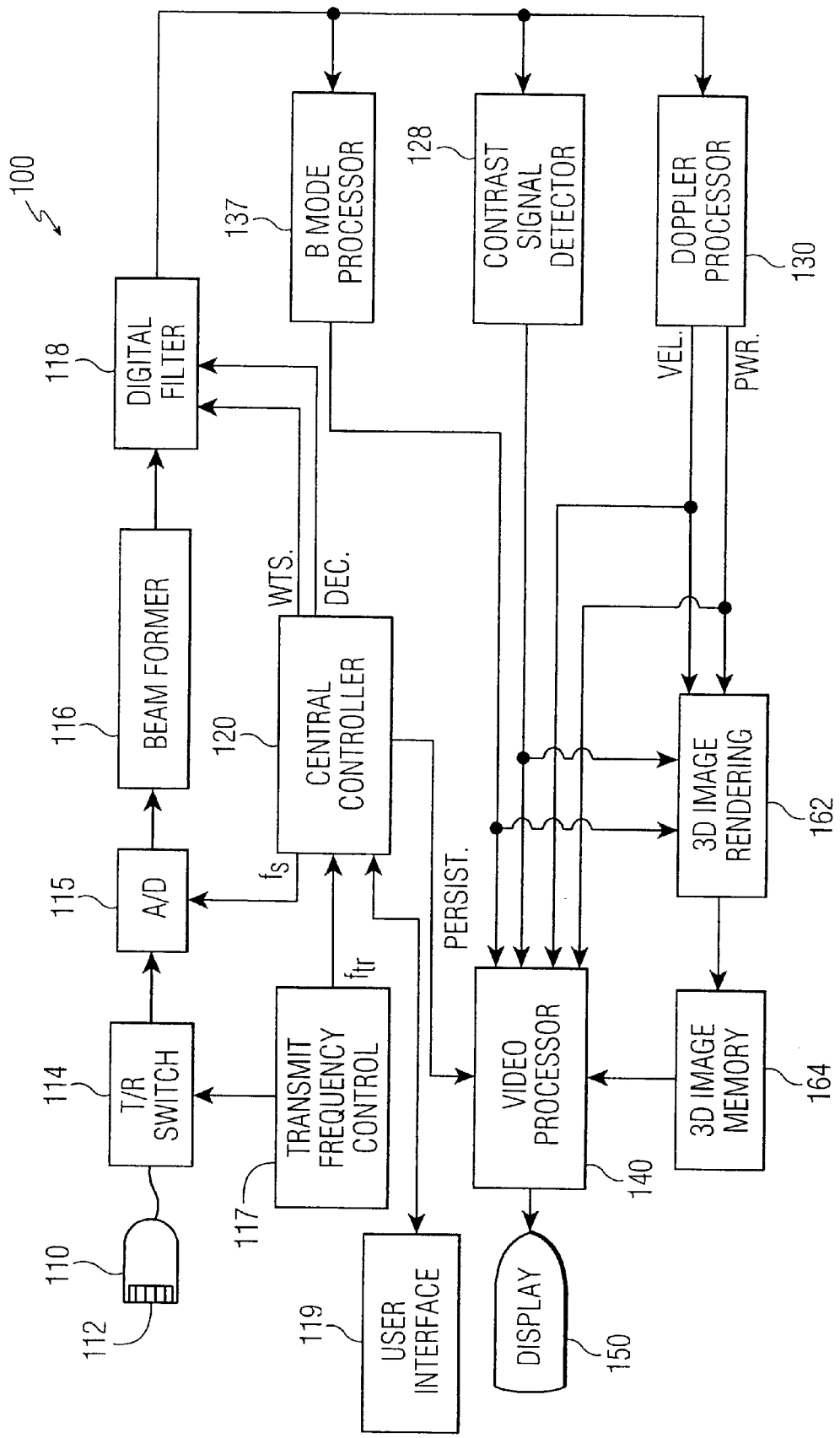

METHOD OF AND SYSTEM FOR ULTRASOUND IMAGING

RELATED APPLICATION

This is a continuation-in-part application of U.S. patent application Ser. No. 10/231,704, filed Aug. 29, 2002, which is a continuation-in-part application of U.S. patent application Ser. No. 09/641,306, filed Aug. 17, 2000 and now U.S. Pat. No. 6,443,896, which are all hereby incorporated by reference herein in their entireties.

BACKGROUND OF THE INVENTION

1. Field of the Invention

The present invention relates generally to ultrasonic imaging and, more particularly, to creating multiple planar ultrasonic images of a volumetric region of the body in real-time. In addition, the present invention relates to a method and system for addressing temporal artifacts in a three-dimensional (3D) ultrasound image of a volume.

2. Description of the Prior Art

In three dimensional (3D) ultrasound imaging, a volume, such as the volume of a heart, is scanned with ultrasound beams and the resultant echoes are used to form an image of the anatomy associated with the volume. In known 3D ultrasound imaging systems, making an image of a significant volume requires a significant amount of time for transmittal of the ultrasound beams necessary to spatially sample the volume adequately. Consequently, the time required to make one volumetric image is overly time consuming, which results in reducing the frame rate of a real time display that is used to display the ultrasound images. In addition, such known prior art systems require a substantial amounts of processing power for processing a volumetric image.

Current 3D ultrasound systems typically display 3D images using either a multiplicity of separate scan planes, or a 3D rendered volume. In either case, the acoustic scan lines, which provide the source of the image data, are arranged in raster patterns. The acoustic scan lines are swept through one dimension to form slices, and slices are swept through an orthogonal dimension to form the volume. An example of such a prior art system is the Volumetric 3D ultrasound scanner. In other known 3D ultrasound systems in which 3D images are displayed by means of multiple planes taken from a volume of interest, only the scan lines from the planes that are displayed may be scanned, but still, the lines of each plane (or slice) are scanned in a single raster sweep across the slice, and the slices are scanned individually.

For example, rather than displaying an entire 3D volume, one display approach, discussed above, is to select planes in a volume for display. Examples of such systems are illustratively shown in U.S. Pat. No. 5,546,807 which is hereby incorporated herein by reference in its entirety. Examples of systems that display two planes are illustratively shown in U.S. Pat. No. 6,241,675, which is hereby incorporated herein by reference in its entirety.

However, if only selected planes of a volume are of interest, the time taken in known systems to scan the other parts of the volume is of very little benefit to the displayed image. Examples of systems in which only the planes that are to be displayed are scanned are illustratively shown in U.S. Pat. No. 6,276,211, which is hereby incorporated herein by reference in its entirety.

Nevertheless, there are features of these prior art systems that are presently unsatisfactory. The frame rates for volume scans, even for the simpler multi-plane 3D formats, are much lower than for single-plane scans typical of today's systems. This is because scanning a volume requires roughly the square of the number of scan lines required for a planar scan. Accordingly, there is a greater time delay between scan lines at the beginning of a frame than those at the end of a frame. That delay causes significant temporal artifacts, whereby the anatomy presented in a single display frame appears geometrically distorted or discontinuous due to the movement of the tissue structures from the time of the first scan line in the frame up to the last scan line in the frame. The phenomenon is called "temporal discordance" or "temporal artifact." "Temporal discordance" occurs because the scan lines of a frame are generated over an extended time window, yet the resulting frame is rendered on the display very quickly, presenting the view as though all the parts of the anatomy were measured simultaneously. "Temporal discordance" is especially apparent when reviewing a series of frames one at a time, where the user can examine and compare the tissue structures displayed in adjacent scan planes that are supposed to be simultaneous.

Accordingly, it is clear that there exists a need for a method and a system for addressing temporal discordance as described above.

SUMMARY OF THE INVENTION

In accordance with the principles of the present invention, method and apparatus are described for creating and displaying multiple planar images of a volumetric region of the body. In one aspect of the invention, two real-time image planes are acquired and displayed in what is referred to herein as a "biplane" display format. The two planes of the biplane display can be controlled in two control modes, one in which one image plane is tilted relative to the other, and another in which one image plane is rotated relative to the other. In another aspect of the invention, an icon is displayed concurrently with the biplane images to inform the clinician as to the relative orientation of the two image planes.

In accordance with another embodiment of the present invention a method of minimizing temporal artifacts in an ultrasound image of a volume is provided. The method includes the steps of selecting a plurality of planes of the volume, scanning a portion of the volume defined by the plurality of planes by alternating between the plurality of planes in a time interleaved manner with an array transducer, generating a three dimensional data set based on the scanning and displaying views of the plurality of planes based on the three dimensional data set.

In accordance with yet another embodiment of the present invention, a method for preventing occurrences of temporal artifacts in an ultrasound imaging display is provided. The method includes the steps of determining a fast moving region of interest, scanning the region of interest with a higher transmit beam density than other regions, performing a scan conversion, and displaying an ultrasound image.

Additional summary information is provided below.

BRIEF DESCRIPTION OF THE DRAWINGS

In the accompanying drawings:

FIG. 1 is a block diagram of an ultrasonic diagnostic imaging system constructed in accordance with the principles of the present invention;

FIG. 8 illustrates an "edge-on" display of intersecting planes from the array transducer with a scanning order in accordance with the principles of the present invention.

DETAILED DESCRIPTION OF THE PREFERRED EMBODIMENT(S)

Figure 2A:
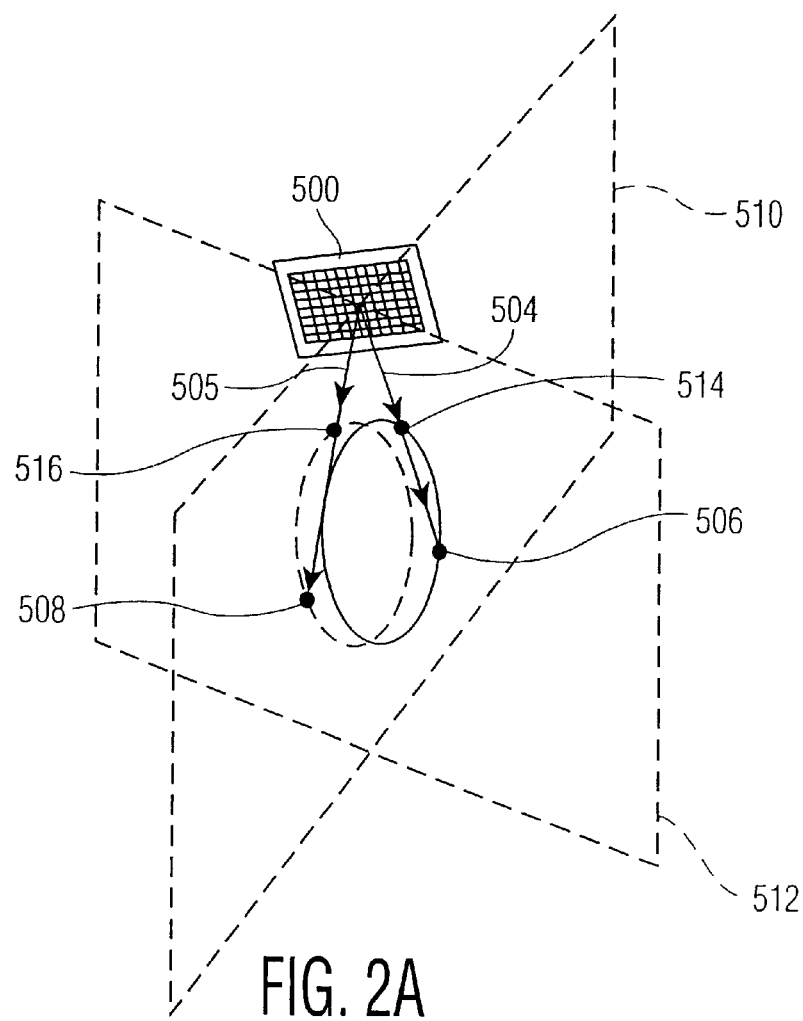
FIGS. 2A and 2B show a display, in real time, of planar images created by use of a two dimensional array transducer with the system of FIG. 1.

The present invention relates generally to ultrasound imaging. In particular, and without limitation, the present invention relates to a method and system for minimizing temporal artifacts in a three-dimensional (3D) ultrasound image of a volume. Generally and in accordance with the present invention scan lines are placed in a frame that scans a medium in three dimensions so that the effects of temporal displacement are minimized or hidden.

FIG. 1 is a block diagram that shows ultrasonic diagnostic imaging system 100. It should be understood that the invention, illustratively described herein, is not limited to use only with imaging system 100. Imaging system 100 is provided herein as an example. In imaging system 100, central controller 120 commands transmit frequency control 117 to transmit a desired transmit frequency band. The parameters of the transmit frequency band, $f_{tr}$, are associated with transmit frequency control 117, which causes transducer 112 of ultrasonic probe 110 to transmit ultrasonic waves in the selected frequency band. It will be understood, of course, that any ultrasonic frequency or group of frequencies, known as a frequency signature, may be used, with due consideration for the desired depth of penetration and the sensitivity of the transducer and ultrasonic system.

Transducer 112 of the probe 110 comprises an array of discrete elements that transmit ultrasonic energy in the form of a beam and receive echo signals returned in response to the transmission. The beam can be steered to scan different parts of an object by mechanically moving the probe or, preferably, by electronically adjusting the timing of the transmission for various array elements in probe 110. In imaging system 100, steering is controlled by central controller 120. Controller 120, in turn, responds to commands from a user that are entered via user interface 119 that includes an interface program and a pointing device, such as a mouse, trackball, stylus, tablet, touch screen or other pointing device. User interface 199 may also include a keyboard, or other input device for conveying instructions to central controller 120. Alternatively, controller 120 may be programmed to steer a beam automatically in a predefined, default manner. The received echo signals are coupled through transmit/receive (T/R) switch 114 and digitized by analog-to-digital converter 115. The sampling frequency $f_s$ of the A/D converter is controlled by central controller 120. The desired sampling rate dictated by sampling theory is at least twice the highest frequency $f_c$ of received echoes. Sampling rates higher than the minimum requirement can also be used. The signal samples from the A/D converter are delayed and summed by beam former 116 to form coherent echo signals. The coherent echo signals are then filtered by digital filter 118 to a desired passband. Digital filter 118 can also shift the frequency band to a lower frequency range or to a baseband frequency range. The characteristics of digital filter 118 are controlled by central controller 120, which provides filter 118 with multiplier weights and decimation control. Preferably the arrangement is controlled to operate as a finite impulse response (FIR) filter, and performs both filtering and decimation. A wide range of filter characteristics is possible through the programming of weights and decimation rates for filter 118. The use of digital filter 118 allows the advantage of flexibility in providing different filter characteristics. Digital filter 118 can be programmed to pass received fundamental frequencies at one moment and harmonic frequencies at the next moment. Digital filter 118 can thus be operated to alternately produce images or lines of fundamental and harmonic digital signals, or lines of different alternating harmonics in a time-interleaved sequence simply by changing the filter coefficients during signal processing.

From digital filter 118, filtered echo signals are detected and processed by B mode processor 137, contrast signal detector 128, or Doppler processor 130. B mode processor 137 performs functions that include, but are not limited to, frequency compounding, spatial compounding, harmonic image formation, and other typical B mode functions that are well known in the art. Doppler processor 130 applies conventional Doppler processing to echo signals to produce velocity and power Doppler signals. The outputs of processors 137 and 130 and contrast signal detector 128 are coupled to video processor 140 for displaying a two-dimensional ultrasonic image on display 150, based on the output. Central controller 120 keeps track of the sequence of the incoming signals, and so enables video processor 140 to use the current data in the forming image. As incoming signals are received by video processor 140, the data from the incoming signals is fed to display 150, which produces rasterized images. The outputs of the two processors and contrast signal detector 128 are also coupled to three-dimensional image rendering processor 162 for rendering the three-dimensional images, which are stored in 3D image memory 164 and provided from there to video processor 140. Three-dimensional rendering may be performed in a conventional manner. With this arrangement, an operator can select among the outputs of contrast signal detector 128 and processors 137 and 130 for two or three dimensional display presentation of an ultrasonic image.

The system of FIG. 1, through the operation and control of probe 110, transducer 112, video processor 140, and/or image rendering processor 162 provides the ability to create multiple real-time planar images of a volumetric region of an object such as, a human body, while the body is being scanned. These planar images, when taken as slices through a body, have known geometric relationships to each other, enabling a diagnostician to view body features from different orientations. The clinician may wish to adjust the relative angles of the slices to visualize spatial relationships of tissue features. Through user interface 119, an operator can adjust the orientation of the slices displayed to align them with the features of interest in the image. Real-time performance is achieved by generating only certain ultrasonic beams needed to construct the desired planar images, rather than the much greater number of beams that would have to be transmitted to scan the entire volumetric region.

Figure 2B:
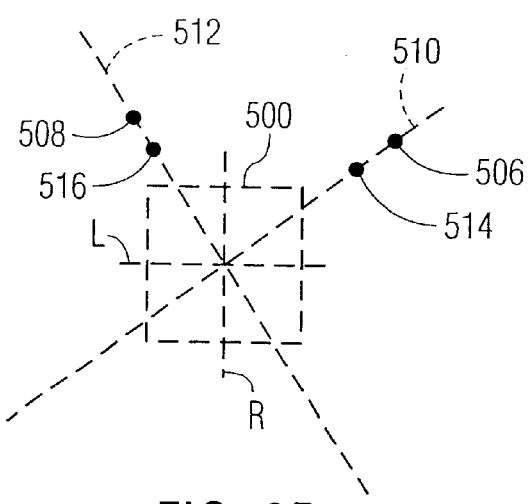

FIGS. 2A and 2B show an embodiment of transducer 500 that can be used to obtain data from a set of planes 510 and 512. This embodiment generates beams such as beam 504 that lies in plane 510 intersecting points 514 and 506 and beam 505 that lies on plane 512 intersecting points 516 and 508. The rays emanating from two-dimensional array transducer 500 can be electronically steered in three dimensions, thus avoiding the need to mechanically sweep the transducer across the volumetric region of interest. In similar fashion, data is received from the lines of interest in the respective planes using well-known beam steering and focusing and/or gating techniques applicable to a two-dimensional array transducer.

The above scanning method for generating two planar images is preferred because of its speed, but is not exclusive. Variations are possible. If desired, additional beams can be generated which lie in and thereby define additional planes, or intersect additional surfaces. Each additional beam, of course, takes additional time to generate and therefore affects the sweep rate. The desired number of planes and their orientation is conveyed to central controller 120 through user interface 119. In addition, transducer 112 can be controlled to emit beams directed toward more than one point in each plane. Alternatively, transducer 112 can be controlled to emit beams at fewer than all surfaces at each sampling position, as long as the beams lie in at least two planes, or intersect at least two non-planar surfaces, or lie in at least one plane and intersect at least one non-planar surface, per sweep. These and other variations can produce multiple planar images in real-time, but at different rates and with different resolutions, depending on the variation chosen. Furthermore, any two-dimensional ultrasonic imaging technique, for example, B mode, contrast signal detection, harmonic imaging, or Doppler imaging, can be applied equally well with this data acquisition scheme.

The data acquired from planes 510 and 512 are used by one or more of processors 137, 130, or used by contrast signal detector 128 to construct the corresponding planar images. The planar images are preferably created at a scanning rate to provide real-time imaging. The planar images can be simultaneously displayed side-by-side by video processor 140, or in a three dimensional perspective view on display 150 as the volumetric region is continuously scanned, or viewed later.

Figure 3:
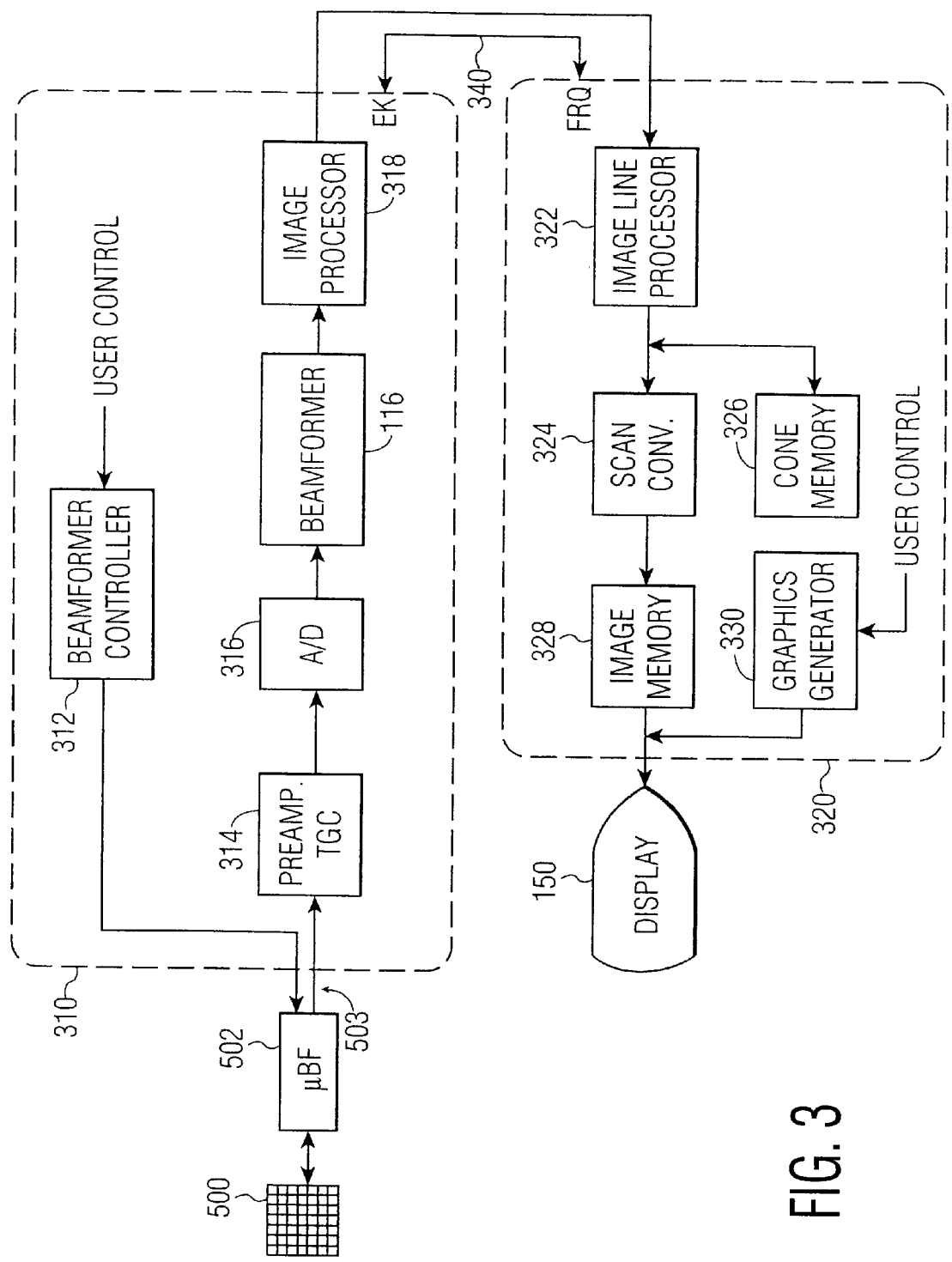
FIG. 3 illustrates in block diagram form a second embodiment of an ultrasonic diagnostic imaging system constructed in accordance with the principles of the present invention.

FIG. 3 illustrates another embodiment of an ultrasound system constructed in accordance with the principles of the present invention. In this embodiment probe 110 includes two dimensional array transducer 500 and microbeamformer 502. Micro-beamformer 502 contains circuitry which control the signals applied to groups of elements ("patches") of array transducer 500 and performs some processing of echo signals that are received by elements of each group. Micro-beamforming in the probe advantageously reduces the number of conductors in cable 503 between the probe and the ultrasound system. Examples of this technique are illustratively described in U.S. Pat. No. 5,997,479 (Savord et al.) and in U.S. Pat. No. 6,436,048 (Pesque) which are incorporated herein by reference in their entireties.

The probe is coupled to scanner 310 of the ultrasound system. Scanner 310 includes beamform controller 312 which is responsive to user control and provides control signals to microbeamformer 502 that instructs the probe with respect to the timing, frequency, direction and focusing of transmit beams. Beamform controller 312 also controls the beamforming of received echo signals through its coupling the analog-to-digital (A/D) converters 316 and beamformer 116. Echo signals received by the probe are amplified by preamplifier and TGC (time gain control) circuitry 314 in the scanner and are digitized by A/D converters 316. The digitized echo signals are then formed into beams by beamformer 116. The echo signals are then processed by image processor 318 which performs digital filtering, such as B mode detection and Doppler processing as described above, and can also perform other signal processing such as harmonic separation, speckle reduction through frequency compounding, and other desired image processing.

The echo signals produced by scanner 310 are coupled to digital display subsystem 320, which processes the echo signals for display in the desired image format. The echo signals are processed by image line processor 322, which is capable of sampling the echo signals, splicing segments of beams into complete line signals, and averaging line signals for signal-to-noise improvement or flow persistence. The image lines are scan converted into the desired image format by scan converter 324 which performs R-theta conversion as is known in the art. The image is then stored in image memory 328 from which it can be displayed on display 150. The image in memory is also overlaid with graphics to be displayed with the image, which are generated by graphics generator 330 which is responsive to a user control. Individual images or image sequences can be stored in cine memory 326 during capture of image loops.

For real-time volumetric imaging display subsystem 320 also includes the 3D image rendering processor 162 of FIG. 1, which receives image lines from the image line processor 322 for the rendering of a real-time three dimensional image which is displayed on display 150.

In accordance with the principles of the present invention, two images, referred to herein as biplane images, are acquired by the probe in real time and displayed in a side by side display format. Since 2D array 500 has the ability to steer transmitted and received beams in any direction and at any inclination in front of the array, the planes of the biplane image can have any orientation with respect to the array and to each other, as shown by the orientation of image planes 510, 512 with respect to array 500 in FIGS. 2A and 2B. However in a preferred embodiment the two image planes intersect the center of array 500 and are orthogonal to the sides of the array as shown by planes L and R in FIG. 2B, in which the planes are viewed "edge-on" from the array transducer. In the examples given below the image format is the sector image format, with the image lines emanating from a near-field apex. However, linear or steered linear scan formats can also be employed.

The biplane images in the two image planes are acquired by transmitting and receiving beams of each image as exemplified by the acquisition of beams 504 and 505 in the respective image planes of FIG. 2A. Various acquisition sequences can be performed. All of the scan lines of one image can be acquired, followed by acquisition of all of the scan lines of the other image. Alternatively, acquisition of the lines of the two images can be time interleaved. For instance, line 1 of one image can be acquired, followed by the acquisition of line 1 of the other image. This would be followed by the acquisition of line 2 of each image, then line 3 of each image, and so forth. This may be advantageous when doing Doppler image of low flow velocities, as the interval between interrogations of an ensemble of lines can be lengthened. It also advantageously results in the lines at the intersection of the two planes being acquired in succession, which prevents rapidly moving tissue at the image intersection from appearing different in the two images. The lines can be acquired in their spatial progression in the image, or sequentially from separated portions of the image. For instance, the four edge lines can be acquired first, followed by the four central lines around the intersection of the planes, then progressing alternately toward and away from the intersection.

In accordance with one embodiment of the present invention, as mentioned above, the scan lines in a bi-plane display can be ordered so that they alternate between the two planes. If the planes are labeled A and B, and the lines sweep from 0 to 90 degrees in each plane, a sequence of sweeps would be 1A, 1B, 2A, 2B, etc. With such an arrangement, the scan time difference is increased from one displayed line to the next within each plane, but the more apparent time discontinuity from plane A to plane B is minimized. Preferably, where the planes intersect in the middle, the two planes are scanned by sequential nearly concurrent beams.

For example, during the scan of intersecting planes, the planes are scanned alternately in a time-interleaved fashion so that substantially concurrent beams scan the region where the planes intersect. Consequently, the anatomy in the common region among the planes would appear the same in the two planar images. If the planes were to be scanned entirely one after the other and if the anatomy in the common region were moving, it could appear differently in the images when the intersecting region is scanned at significantly different points in time. In accordance with the principles of the present invention, the above problem is resolved by alternating scanning between the planes.

Alternatively, such methods can be extended to multiple planes. For example, with three planes A, B and C the scanning sequence would be 1A, 1B, 1C, 2A, 2B, 2C, etc.

In accordance with another embodiment of the present invention, in a volume rendered display, the scan lines can be ordered so that those that are nearest the fastest moving parts of the 3D image, such as the moving valve in the heart, being the most susceptible to temporal artifact, are scanned first and close together in time. In addition, when scanning a 3D volume with something in it that is considerably small such as the valve, the beam density can be increased for the beams which scan the valve. This will enable the small valve to be shown in considerably more detail than structures which are less densely scanned such as the heart wall, and scanning the valve with beams that are in rapid succession will eliminate much of the motion artifacts from the valve in the image.

The fast-moving parts of the image can be determined by the system through one of several methods, such as a line-to-line correlation function. Such methods are well known to those skilled in the art. Once the regions with high-speed motion are identified (as groups of scan lines), the user can trigger the re-ordering with a "Motion Resolution" button on the user interface (UI) 119 of FIG. 1, and the system will coordinate rearrangement of scan line ordering and the corresponding unscrambling of the lines during image scan conversion for display. The "Motion Resolution" function lets the user select the resolution of the resulting image. Typically, the higher the resolution, the longer the acquisition time in heartbeats.

When all of the lines of both images have been received by scanner 310 of FIG. 3 and forwarded to display subsystem 320 of FIG. 3, scanner 310 sends an "EK" signal over control lines 340 to display subsystem 320, informing the display subsystem 320 that all of the lines for the current display frame have been sent for display. The display subsystem 320 then processes the image lines for display. For the biplane format, one image is processed, formatted, and mapped for display on one side of the display screen and the other image is processed, formatted and mapped for display on the other side of the display screen. After the images have been processed the display subsystem 320 returns an "FRQ" control signal to the scanner 310, informing the scanner 310 that the display subsystem 320 is requesting another image frame for processing. The complete screen display of two side-by-side images is overlaid with the graphics for the images and displayed on display 150 of FIG. 3. The display subsystem 320 then awaits the completion of another scanning of the two images as indicated by the concluding receipt of another EK signal, at which time the processing and display of another real time display frame proceeds again.

It is also possible to use a communication architecture in which each image is concluded with an EK signal and the transmission and receipt of both biplane images are each concluded by an EK signal and responded to with an FRQ signal. The transmission and receipt of both biplane images is done before a two-image display frame is produced by display subsystem 320.

Figure 4:
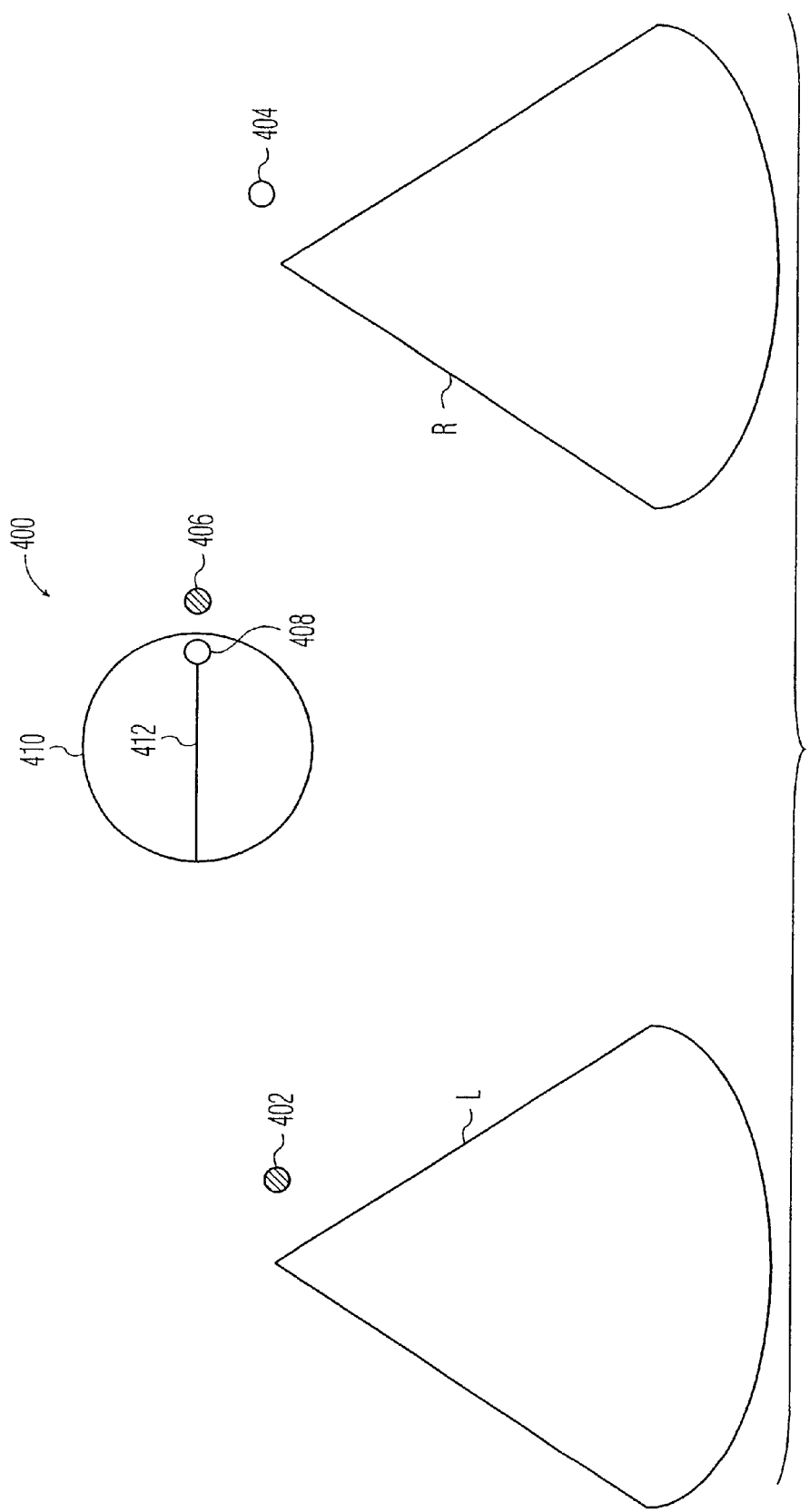
FIG. 4 illustrates a biplane display when operating in the "rotate" mode in accordance with the principles of the present invention.
Figure 7:
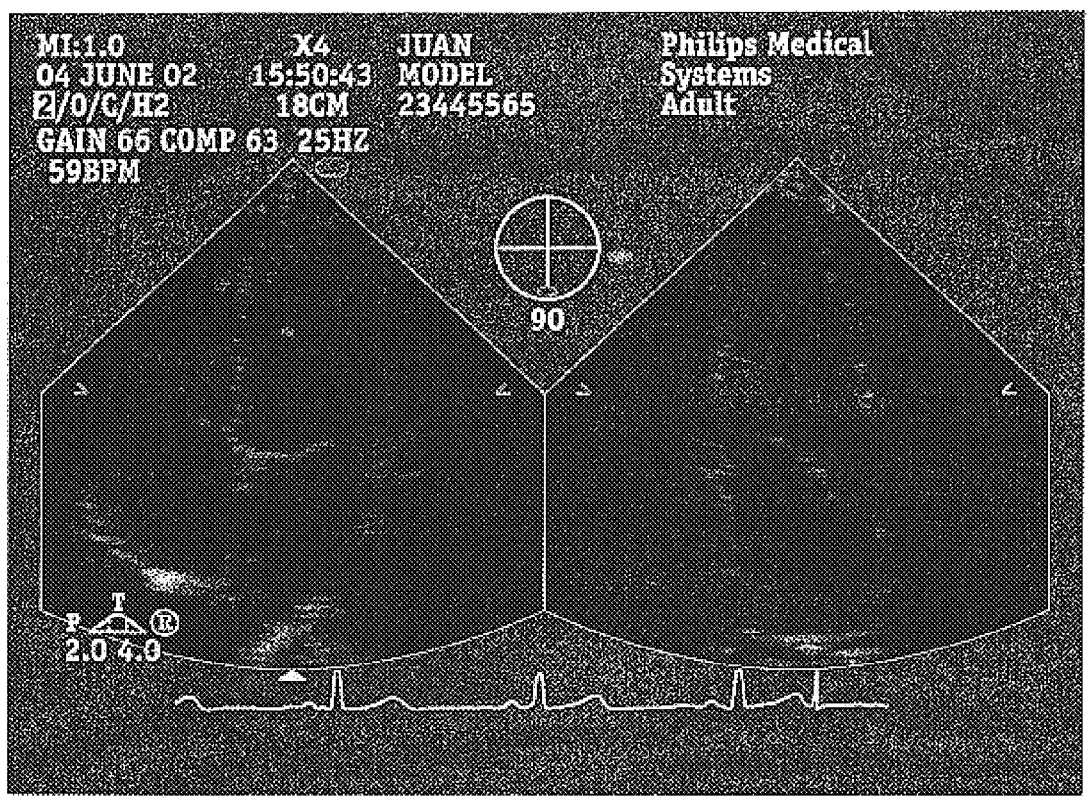
FIG. 7 is a photograph of an actual ultrasound system display when operating in the rotate mode in accordance with the principles of the present invention.

The images are displayed side-by-side as illustrated graphically by images L and R in FIG. 4 and by the photograph of the system display shown in FIG. 7. In a preferred embodiment the image plane orientations are selected by one of two selection modes, "rotate" or "tilt." In a preferred embodiment, the orientation of one image, the left image L in FIG. 4, is fixed in relation to the transducer array. The L image is always in a plane which is orthogonal to the plane of the array, extending through the center of the array as shown in FIG. 2B. The plane of the right image R can be rotated or tilted by user control relative to the plane of image L. In the rotate mode, the two images always share a common center line during sector imaging, and the plane of the right image R can be rotated by manipulation of a user control such as a trackball or knob. The right image can be rotated from being co-planar with the left reference image to a 90° orientation and then back to co-planar again. A full 360° range of rotation is possible either by manipulation of the user control or by left-to-right inversion of the image. In the tilt mode the center of the right image R always intersects the reference image, but can be tilted to intersect different lines of the reference image as if the sector is swinging from the common apex of the two images.

In a preferred embodiment, the probe 110 has a marker on it which identifies a given side of the image. Generally this marker is a physical protrusion or color on one side of the probe casing. Clinicians use this marker to relate the orientation of the probe to the orientation of the image on the display. It is customary to display the marker on the display screen as shown by dot 402 in FIG. 4. The clinician will generally always hold the probe with the probe marker in the same position so that the image is always shown with an orientation which the clinician prefers. In accordance with a further aspect of the present invention, the second image R is also shown with an orientation marker 404. In the rotate mode the two images can both image the same plane when scanning is initiated, in which case the markers are spatially aligned. The clinician can then rotate the right image plane from the common starting orientation. In a constructed embodiment, the initial condition of the two biplane images is that the two are aligned untilted along a common center line and rotated 90° with respect to each as shown in FIG. 7.

In accordance with a further aspect of the present invention, icon 400 is displayed on the biplane display to graphically indicate the relative orientation of the two image planes. Icon 400 in FIG. 4 represents a view of the image planes from the transducer array and includes circle 410 which graphically represents the space in which the base of the sector R can rotate. Dot 406 corresponds to dot 402 of the left reference image L and indicates that the plane of the reference image is in a horizontal orientation across circle 410 with the marker at the right of the image. Line 412 of icon 400 indicates that the right image R is in the same orientation with right image marker 408 (corresponding to dot 404) at the right side of the image.

Figure 5A:
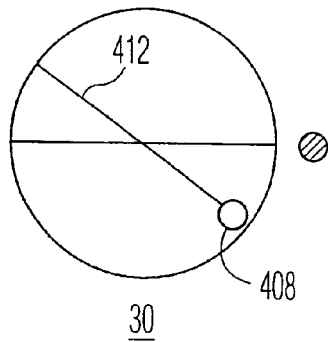
FIGS. 5A–5D illustrate the plane orientation icon of FIG. 4 for different image plane orientations in accordance with the principles of the present invention.
Figure 5B:
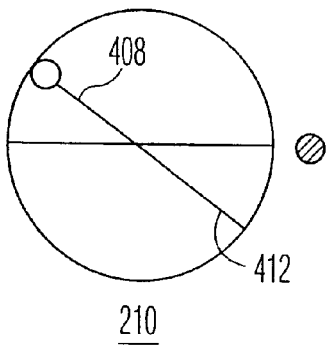

FIGS. 5A–5D illustrate how icon 400 changes as the right image is rotated. When the right image is rotated 300 from the plane of the reference image, icon 400 will appear as shown in FIG. 5A, in which line 412 and dot 408 represent the plane of the right image rotated thirty degrees. The number "30" also appears below the icon. The right image plane can be rotated another 180°, in which case line 412 and marker dot 408 will appear as shown in FIG. 5B. The number below the icon changes to "210" to indicate a 210 degree orientation with respect to the reference image plane. Alternatively, in the preferred embodiment, the user interface of the ultrasound system includes a "right image invert" control. When this control is actuated, the right image will immediately invert laterally by 180°, and the icon will correspondingly switch from that shown in FIG. 5A to that shown in FIG. 5B.

Figure 5C:
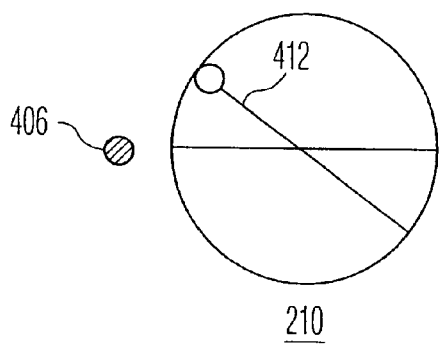
Figure 5D:
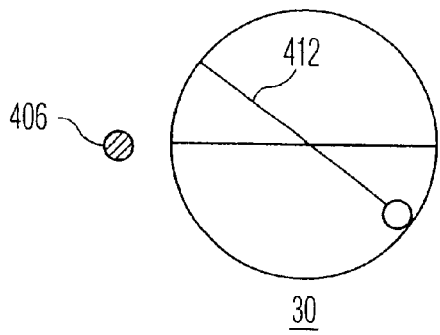

Similarly, the preferred embodiment includes a "left image invert" control which laterally inverts the left image. FIG. 5C illustrates the icon when the reference image has been inverted, in which case marker dot 406 is at the left side of the icon. In FIG. 5C the right image is at a 210 degree orientation with respect to the original (uninverted) position of the reference image as shown by line 412 and the number displayed below the image. In FIG. 5D, the reference image has been inverted with the right image at a 30° orientation with respect to the original position of the left reference image.

An advantage of the common display of the biplane images and the icon is that when the images on the display screen are saved, the icon is also saved without further effort by the sonographer. During later review of the images by a clinician, the orientation of the two image planes is shown on the display or in the print of the screen. The screen display can be saved either in hard copy or electronically and can be retrieved to later enable the patient to be scanned again with the same biplane image orientation.

It may be desirable to have icon 400 of FIG. 4 graphically indicate the portion of rotational circle 410 which corresponds to 0°–180°, and the portion which corresponds to 181°–359° in the numeric notation displayed below the icon. This may be done by using visibly distinguishable graphics for the lower and upper halves of circle 410. For instance the lower half of circle 410 could be displayed with a brighter or bolder line than the upper half, or could be dotted or dashed while the upper half is drawn with a solid line. Alternatively, the lower and upper halves could be differently colored, blue and green for instance, with the color of the numeric notation corresponding with changes in the rotational angle of the right plane R.

Figure 6:
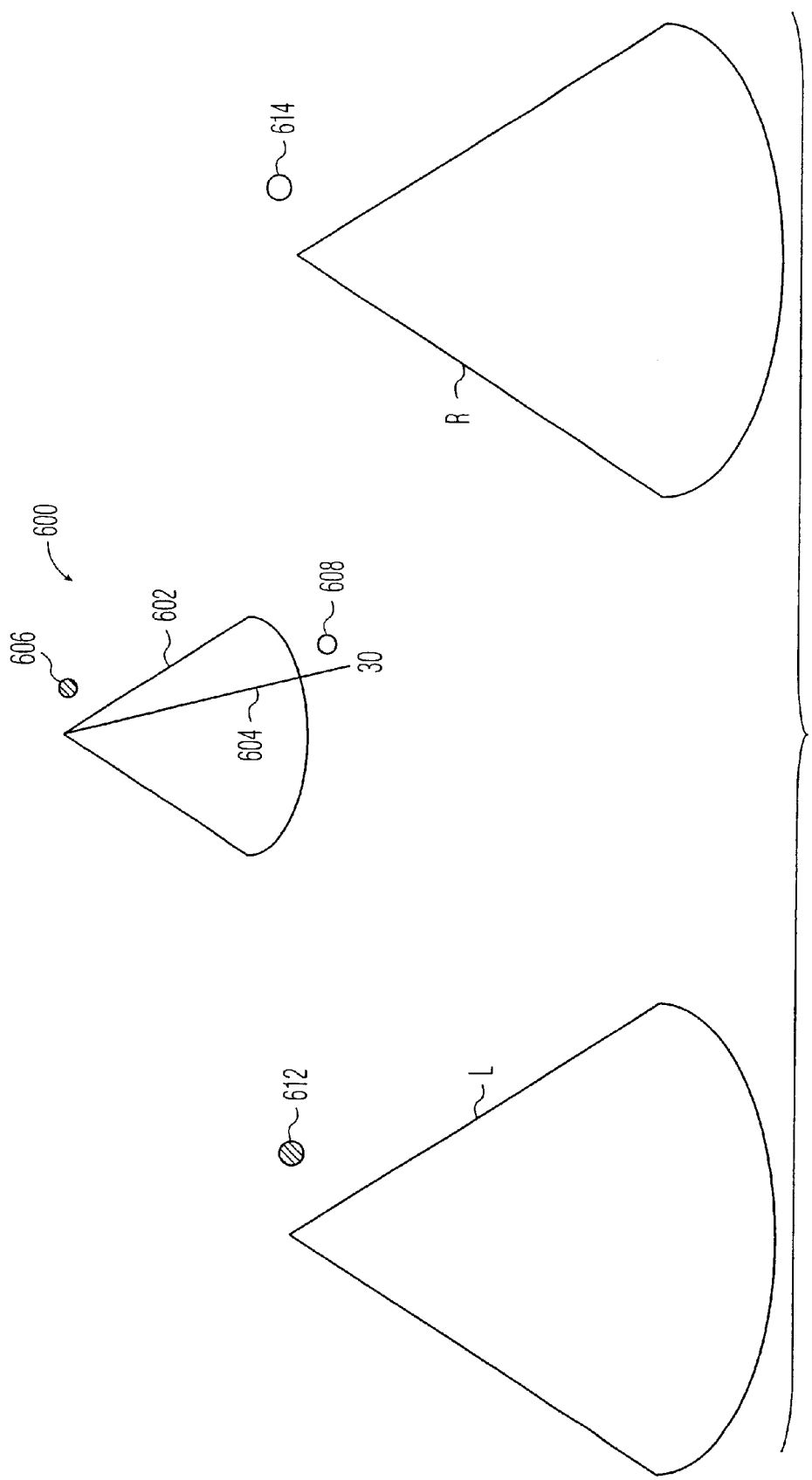
FIG. 6 illustrates a biplane display when operating in the "tilt" mode in accordance with the principles of the present invention.

FIG. 6 illustrates the display screen when operating in the "tilt" mode. In this mode the plane of the left image L is again fixed relative to the plane of the transducer array, and the right image R can be tilted from one side of the reference image to the other as if swinging from the common apex of the two images. In a constructed embodiment, the two planes are always oriented 90° to each other in the lateral (rotational) spatial dimension. In a preferred embodiment the center line of the right sector image R always intersects the reference image, but it intersects the reference image at a line of the left sector which is selected by the user. Icon 600 indicates the relative orientation of the two image planes. In icon 600, small graphical sector 602 represents the fixed position of the left reference image. Cursor line 604 represents the right image viewed "edge-on" from the side. In this example the right image plane is tilted 30° from a nominal orientation in which the center lines of the two images are aligned, which is a 0° reference orientation. In the nominal (initial) orientation the cursor line is vertically oriented in icon 600.

As an alternative to icon 600, cursor line 604 can be displayed over the reference image L. The user can manipulate a user control to change the tilt of the right plane R, or can drag the cursor line from one side of the image R to the other to change the tilt of the right plane. Cursor display types, other than a line, such as dots or pointers, can also be used for cursor 604.

The tilt mode is particularly useful for conducting longitudinal studies of infarcts. Suppose that cardiac imaging of a patient reveals abnormal heart wall motion in the vicinity of the papillary muscle tips. With conventional 2D imaging, the clinician may try to image the infarcted wall by first acquiring an image of the papillary muscle in a long axis view of the heart, then rotating the probe ninety degrees to image the infarct location in a short axis view. However, if the probe (and hence the image plane) is not precisely rotated, the clinician can miss the infarct location. With the biplane tilt mode, the clinician can move the probe until the papillary muscle is shown in the reference image in a long axis view, then can tilt cursor line 604 to point to or overlay the papillary muscle tips in the long axis reference image, thereby bringing the infarcted location into view in the tilted right image R in a short axis view. When the clinician wants to view the same section of the heart wall in a short axis view three or six months later in a longitudinal study, the process of imaging the papillary muscle in a long axis view in the left image, pointing tilt cursor 604 in the same inclination, and viewing the infarcted region in a short axis view in the right image can be precisely repeated, thereby improving the diagnostic efficacy of the longitudinal study.

FIG. 7 shows two biplane images in the rotate mode. The icon between the two images in the center of the screen shows that the right image plane has been rotated ninety degrees from alignment with the left reference image plane. The marker dots are clearly visible in the icon and on the right sides of the apexes of the two sector images. For completeness of a cardiac study, the EKG trace is also shown below the biplane images.

An advantage of the present invention is that since only two planes of a volumetric region are being imaged, acquisition of the two images can be done rapidly enough so that the two images can both be real-time ultrasonic images at a relatively high frame rate of display. A further advantage is that the ultrasound system need be only a conventional two dimensional imaging system. As FIG. 3 shows, the display subsystem for biplane imaging can be a conventional two dimensional image processing subsystem, which means that biplane imaging in accordance with the present invention can be done with the two dimensional ultrasound systems currently in the hands of clinicians. The scanner and display subsystem of FIG. 3 needs no unique 3D capabilities in order to produce the biplane image shown in FIG. 7.

The tilt and rotate modes can be combined, enabling a user to view biplane images which are both tilted and rotated relative to each other.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method for ultrasound imaging of a volume, the method comprising:

selecting a plurality of planes of the volume;

scanning a portion of the volume defined by the plurality of planes by acquiring scan frame subsets of one or more scanlines within each of the respective scanning planes of the plurality of planes in a time interleaved manner;

generating a data set based on the scanning; and displaying views of the plurality of planes based on the data set.

2. The method of claim 1, wherein the data set is a three dimensional data set.

3. The method of claim 1, further comprising scanning a region of intersection between the plurality of planes with substantially concurrent ultrasound beams.

4. The method of claim 1, further comprising detecting sets of scan lines located on faster moving regions of interest than other sets of scan lines; and scanning the faster moving regions of interest with a higher ultrasound beam density than other regions.

5. The method of claim 4, further comprising detecting the fast moving region of interest using a line-to-line correlation function.

6. The method of claim 4, further comprising rearranging the scan line ordering for display.

7. A method of claim 1, further comprising:

determining a faster moving region of interest than other regions;

scanning the faster moving region of interest with a higher transmit beam density than other regions;

performing a scan conversion; and displaying an ultrasound image.

8. The method of claim 7, further comprising determining the fast moving region of interest using a line-to-line correlation function.

9. A system for ultrasound imaging of a volume, the system comprising:

means for selecting a plurality of planes of the volume;

means for scanning a portion of the volume defined by the plurality of planes by acquiring scan frame subsets of one or more scanlines within each of the respective scanning planes of plurality of planes in a time interleaved manner;

means for generating a data set based on the scanning; and means for displaying views of the plurality of planes based on the data set.

10. The system of claim 9, wherein the data set is a three dimensional data set.

11. The system of claim 9, further comprising means for scanning a region of intersection between the plurality of planes with substantially concurrent ultrasound beams.

12. The system of claim 9, further comprising means for detecting sets of scan lines located on faster moving regions of interest than other sets of scan lines; and means for scanning the faster moving regions of interest with a higher ultrasound beam density than other regions.

13. The system of claim 12, further comprising means for detecting the fast moving region of interest using a line-to-line correlation function.

14. The system of claim 12, further comprising means for rearranging the scan line ordering for display.

* * * * *